July 20, 1943.　　A. H. KELLING　　2,324,850
MANUFACTURE OF STARCH
Original Filed June 5, 1933　　2 Sheets-Sheet 1

July 20, 1943.   A. H. KELLING   2,324,850
MANUFACTURE OF STARCH
Original Filed June 5, 1933   2 Sheets-Sheet 2
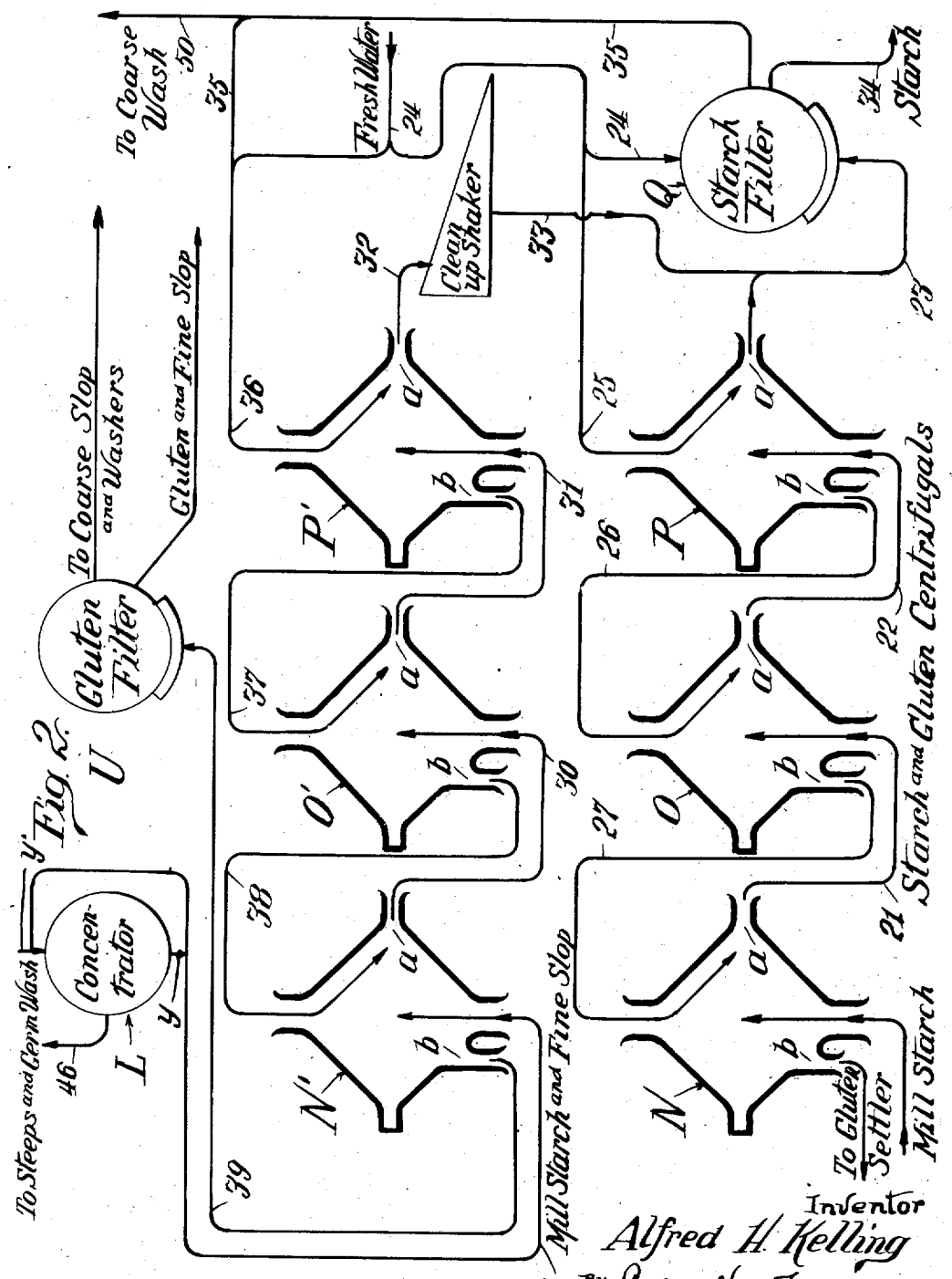

Patented July 20, 1943

2,324,850

UNITED STATES PATENT OFFICE 2,324,850

MANUFACTURE OF STARCH

Alfred H. Kelling, Oak Park, Ill., assignor, by mesne assignments, to Corn Products Refining Company, New York, N. Y., a corporation of New Jersey Original application June 5, 1933, Serial No. 674,366. Divided and this application June 4, 1936, Serial No. 83,541

2 Claims. (Cl. 127—68)

This invention relates to the manufacture of starch from corn by the wet method; and more particularly to a process in which all, or substantially all, of the process waters (except the steep water or water absorbed in the discharged solids) are returned to the system and reused, none going to the sewer, for the purpose of saving solids therein, soluble and insoluble, and preventing the pollution of streams which results from the discharge of process waters from the factory.

In the manufacture of starch from corn, it is customary to steep the corn, withdraw the steep water to evaporators for the recovery of solubles, and after comminuting the steeped corn, subject it to separating operations in which the starch and gluten are removed from the germs, bran and fiber. It has been usual to grind the degerminated corn as finely as possible and then subject the same to what is known as a coarse slop separating or washing operation in reels or over shakers covered with copper for the separation of the major portion of the slop (hull, bran and fiber) from the starch and gluten. The starch milk issuing from the coarse slop system is then passed through fine sieves to remove residual bran and fiber particles, and the tailings from these sieves are then subjected to what is known as a fine slop washing operation in which the material is passed through a series of silk covered reels or over silk covered shakers for the purpose of washing the residual slop free of starch and gluten.

The mill starch (starch, gluten and water) from the germ, coarse slop and fine slop separations is then tabled, according to the usual practice for many years, in order to separate the gluten from the starch, the starch settling on the tables and the gluten and major portion of the water tailing off into gluten settlers, in which the gluten subsides. The starch removed from the tables by flushing or otherwise, is ordinarily dewatered and washed in starch filters of the displacement type, functioning by vacuum or pressure, and the filtrate from this operation together with the water from the gluten settlers, are returned to the process for steeping the corn and as wash waters in the germ, coarse slop and fine slop separations.

In application of Alfred H. Kelling, Serial No. 675,412, filed June 12, 1933, a method is disclosed for effecting the separation of the gluten from the starch, by the use, in a particularly advantageous manner, of centrifugal machines which therefore take the place of the customary starch tables. In application Serial No. 674,366, filed June 5, 1933, of which the present case is a division, certain methods are disclosed in which the centrifugal machines are used not only for the separation of gluten from the starch but also for the separation from the starch milk issuing from the coarse slop system of its residual bran and fiber particles, that is, its fine slop; so that in such case the centrifugal machines take the place not only of the starch tables but of the fine slop system of silk covered reels and/or shakers—an apparatus which is expensive and inconvenient to maintain in repair.

In these processes the aim is to reduce the quantity of the process water which, by the nature of the process, has the highest content of the solubles and other impurities and which is most highly infected with micro-organisms, that is to say, that gluten settler water, so that all of this water, or at least the much greater portion of it, may be reused in the steeping operation and none, or but very little, in the subsequent steps of the process; the intent being that all of the process waters, or at least, a very large proportion of them, should be reused in one way or another in the process, except, of course, the steep water, which is discharged out of the process and the water absorbed in the discharged solids. It is also the aim of these inventions to provide for eliminating solubles and other impurities from the waters intended to be returned to the separating operations and to concentrate the eliminated solids in the water intended to be used for steeping. The use of a more or less highly infected water and one containing a considerable quantity of soluble substances, including yellow color substance, causes no inconvenience in the steeping operation. In that operation the corn material is in the form of unbroken kernels, little susceptible to bacterial action or to contamination by soluble impurities. Moreover, the high temperature and sulphur dioxide concentration in the steeping operation inhibits bacterial action. On the other hand, the separating operations are each carried on at lower temperatures and with lower sulphur dioxide concentrations; and the material is in a finely divided state, making it peculiarly susceptible to bacterial action and to contamination by soluble including color substance and colloidal impurities. As the result of these improvements a purer starch is obtained than where gluten water is used in large measure in the separating operations. Moreover, the starch is whiter since the substances tending to give corn starch a yellow tinge are among the impurities which, according to the present inventions, are concentrated in the water which is discharged from the system through the steeps. The net result that the wet starch system operations, that is the germ, coarse slop and fine slop separations, are carried on with relatively pure water, despite the fact that all process waters are returned to the system.

In the process disclosed in Fig. 1 of application No. 674,366, a certain amount of gluten settler water is returned to the separating operations for the reasons that there is more of this process water than can be economically used in steeping and evaporating operations; and two gluten settlers or sets of gluten settlers, are provided, one for the overflow from each centrifugal system. This re-use of gluten settler water in the separating operations even in the small quantities contemplated by the process just referred to is not desirable for the reasons stated, and in Fig. 2 of application 674,366, which discloses the subject matter of the present divisional application, certain arrangements are provided whereby all of the gluten settler water may be sent to the steeps, none being used in the germ, coarse slop or fine slop separating operations so that the steps of the process following the steeping operation are substantially free from micro-organisms, the products of micro-organic activity and from solubles and other impurities. Moreover the number of gluten settlers may be reduced.

This invention is illustrated in the appended drawings, in which

Fig. 2 is a more detailed diagram of the centrifugal systems.

Figure 1:
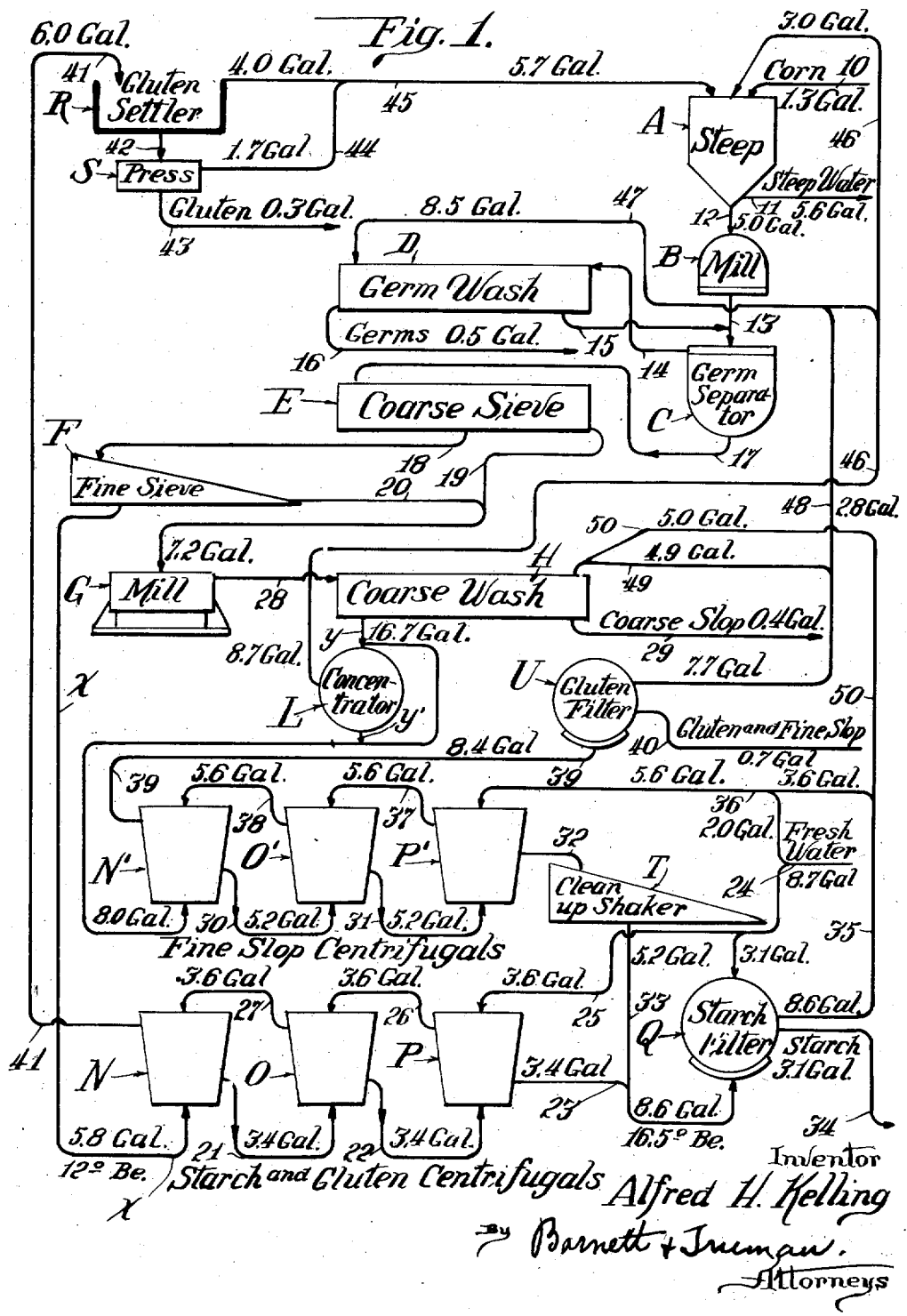
Fig. 1 is a flow sheet diagram of the entire process.

In Fig 1 the numerals followed by the abbreviation "Gal." represent the gallons of water present per bushel of corn ground. The indicated water balance is, of course, purely illustrative and subject to variations and modifications. The term "pipe" as used herein is intended to include any suitable trough conduit, conveyor, or other means for moving the material or liquids from point to point in the system. The term "slop" is intended to include the hull fragments, fiber and other cellulosic constituents of the corn. The invention is not confined to any particular form of apparatus. The representations of apparatus in the drawings are wholly diagrammatic. In actual practice batteries of steep tanks, mills and the like will be used instead of the single units shown.

Referring first to Fig. 1 of the drawings, A designates the steeping system which ordinarily consists of a plurality of steep tanks operated on the counter-current principle; B the mill for breaking up the steeped corn to free the germs; and C the germ separator. The germs floated off from the liquid in separator C are washed in the germ washing system D which comprises a series of shaking sieves and/or reels. The degerminated grain at the bottom of separator C is screened through a coarse sieve E and a fine sieve F, and the tailings from both sieves are fine ground in mill G. H represents the coarse slop washing system for separating starch and gluten from the slop particles. N, O and P are centrifugals, of which there may be any suitable number, for effecting the separation as between the starch and the gluten in the mill starch derived from the germ system through sieves F, N', O' and P' are centrifugals for separating both gluten and fine slop from the starch milk coming from the coarse slop system H. Q is a filter for dewatering and washing the gluten freed starch. R is a gluten settler and S a press for pressing out water from the gluten removed from the settler. L is a concentrator for extracting water from the starch milk issuing from the coarse slop system; T, a clean up shaker arranged in the starch line between centrifugal P' and starch filter Q; and U a gluten filter for extracting water from the overflow from centrifugal N'.

In the description of the operation of the process which follows, reference will be made to the connections between the several instrumentalities referred to above.

*Operation of process.*—The corn containing 1.3 gallons of water enters the steeping system A at 10; and 5.6 gallons of steep water are drawn off at 11 and sent to the evaporators (not shown).

The steeped corn passes thrrough pipe 12 with 5.0 gallons of water to the mill B, and the coarse ground corn from the mill B through pipe 13 to the germ separator C. The germs floated in separator C pass through pipe 14 to the germ washing system D, starch milk from which passes back through pipe 15 to the separator C to maintain a proper amount of separating fluid of the requisite gravity for the flotation of the germs. The germs carrying 0.5 gallon of water are discharged from the washing system D at 16. The degerminated corn passes from the separator C through pipe 17 to the coarse sieve E; and the liquid from the coarse sieve E passes through pipe 18 to the fine sieve F. The tailings from the coarse sieve E go through pipe 19 to the mill G and are joined by the tailings from the fine sieve F, as indicated at 20, this material carrying 7.2 gallons of water. The mill starch (starch, gluten and water) from the fine sieve F, that is to say from the germ system, passes through pipe *x*, the amount being 5.8 gallons, to the starch and gluten centrifugals N, O and P, the stream consisting of 5.8 gallons with a density of about 12° Baumé being introduced into the first of these centrifugals N. The underflow, principally starch, from the centrifugal N, 3.4 gallons, passes through pipe 21 to centrifugal O, the underflow from which, 3.4 gallons, passes through pipe 22 to centrifugal P. The underflow from centrifugal P, 3.4 gallons, passes through pipe 23 to the starch filter Q. Fresh water is introduced into the starch filter Q through pipe 24, the amount being 3.1 gallons; and 3.6 gallons of fresh water are introduced into centrifugal P through branch pipe 25. The overflow from centrifugal P, carrying the gluten, passes through pipe 26 to centrifugal O; and the overflow from centrifugal O passes through pipe 27 to centrifugal N.

The material fine ground in mill G passes through pipe 28 to the coarse wash from which the coarse slop, with 0.4 gallon of water is discharged at 29. The mill starch from the coarse slop system, 16.7 gallons, passes into a pipe *y* leading to the first centrifugal N' of the series of fine slop centrifugals. Arranged in a by-pass *y'* across the pipe *y* is a concentrator L which may be a settling tank, but is preferably a filter, and which functions to extract water from the coarse slop mill starch. As shown 8.7 gallons of water are so extracted and this concentrates the mill starch going to the centrifugal N' to a water content of 8.0 gallons. The underflow from centrifugal N' passes through pipe 30 to centrifugal O' and the underflow from centrifugal O' passes through pipe 31 to centrifugal P', the amounts being in each case, 5.2 gallons. The underflow from centrifugal P' passes through pipe 32 to the clean-up shaker T, the purpose of which is to remove any residual bran particles, the starch from the clean-up shaker passing through pipe 33 to pipe 23 and the starch filter Q, the amount being 5.2 gallons which, added to the starch coming from centrifugal P, gives a flow to the starch filter of 8.6 gallons having a density of 16.5° Baumé. The starch is discharged from the filter at 34 and contains 3.1 gallons of water. 8.6 gallons of starch filtrate and wash water are discharged from filter Q through pipe 35, 3.6 gallons going to the centrifugal machines P' together with 2.0 gallons of fresh water introduced through branch pipe 36 of the fresh water supply pipe 24. The overflow from centrifugal P', 5.6 gallons containing gluten, fine slop and solubles, passes through pipe 37 to centrifugal O'; and the overflow from centrifugal O', 5.6 gallons, passes through pipe 38 to the centrifugal N'. The overflow from centrifugal N' passes through pipe 39 to the filter U, the amount being 8.4 gallons. The gluten and fine slop containing 0.7 gallon of water is discharged from the filter at 40.

Preferably in each of the centrifugal systems, the wash water for each centrifugal, whether fresh water or a mixture of fresh water and process water or the overflow from another centrifugal, is introduced into the underflow or starch zone of the centrifugal which it enters, as shown in Fig. 2 where $a$ designates the starch zone in each centrifugal and $b$ the outlet from the gluten zone. The result of this is that the solubles are concentrated in the overflows from the centrifugals and ultimately in the overflow from the first centrifugal N or N' of the series as the case may be. This facilitates the final washing of the starch in the starch filter or filters, the primary purpose of which operation is to remove solubles. Therefore, the centrifugal machines take the place not only of the starch tables and of the reels and/or shakers of the silk or fine slop systems but also, to a certain extent, they take the place of the starch washing or filtering operation. The concentration of the solubles in the overflow is the result in part of dilution of the underflow but in part is due to the displacement from the underflow or starch zone to the overflow of the gluten zone of solubles containing water. Before reaching the starch zone an appreciable quantity of water containing solubles is split from the starch milk before it mingles with the wash water. This is demonstrable from the fact that as a matter of experiment dilution cannot account for the extent of concentration of solubles in the overflow.

The process waters are re-routed to the process as follows:

The high soluble water in the overflow from the centrifugal machine N, 6.0 gallons, passes through pipe 41 to the gluten settler R. The gluten from the settler passes through pipe 42 to press S from which the gluten, containing 0.3 gallon of water, is discharged at 43. The water from the press, 1.7 gallons, goes through pipe 44 to a pipe 45 which conducts the water drawn off from the settler, 4.0 gallons, to the steeping system A, the amount from both sources being 5.7 gallons.

The water from concentrator L, 8.7 gallons, is returned in part to the steeping system (the amount of settler water being insufficient for steeping) and the rest to the germ wash D, 3.0 gallons going from the concentrator L to steep A through pipe 46 and 5.7 gallons through branch pipe 47 to the germ wash D.

The water from filter U, 7.7 gallons, is also divided, 2.8 gallons going through pipe 48 to the germ wash D and 4.9 gallons through branch pipe 49 to the coarse wash H. The filtrate and wash water from the starch filter Q, 8.6 gallons, is returned in part, 3.6 gallons, to the centrifugal machine P', as described, the rest, 5.0 gallons, going back through pipe 50 to the coarse slop system H.

It will be apparent from the foregoing that no process water which has remained for any considerable time in the process or which contains a large quantity of solubles is returned to a place in the system where it can bring about contamination of the starch.

The inventions common to this application and application No. 674,366 of which this case is a division, are not claimed herein, being claimed in the parent case. It is the intention, however, to cover by patent herein all modifications of the herein described process within the scope of the appended claims.

I claim:

1. Process of manufacturing starch from corn which comprises: steeping and comminuting the corn; subjecting the comminuted corn to germ and coarse slop separation in water; centrifuging the mill starch from the germ separation; setting the overflow from the centrifuging operation to remove gluten and returning substantially all of the gluten settler water to the steeping operation; concentrating the mill starch from the coarse slop separation by extraction of water; centrifuging the concentrated mill starch to remove the gluten and fine slop from the starch; removing the gluten from the overflow from the last named centrifuging operation; and returning water from said concentrating operation and from the last named operation for removing gluten from overflow to the separating operations performed on the comminuted corn material.

2. Process of manufacturing starch from corn which comprises: steeping and comminuting the corn; subjecting the corn to germ and coarse slop separations in water; subjecting the mill starch from the germ separation to a series of centrifuging operations in which the underflow moves in one direction and the overflow, as wash water, moves in the other direction; settling the gluten out of the overflow from the centrifugal system and returning the gluten settler water to the steeping operation; concentrating the mill starch and fine slop mixture from the coarse slop separation, by elimination of water, and returning water from this operation to the steeping operation and germ separation; subjecting the concentrated coarse slop mill starch to a series of centrifuging operations in which the underflow moves in one direction and the overflow, as washwater, in the other direction; removing the gluten from the overflow from the last mentioned centrifuging operation and returning water from this operation to the germ and coarse slop separations; washing the starch and using the water therefrom in the coarse slop separation and as a wash water for the centrifuging operation on the coarse slop mill starch; and using fresh water for the centrifuging operation on the germ separation mill starch.

ALFRED H. KELLING.